(12) United States Patent
Urano et al.

(10) Patent No.: US 8,046,252 B2
(45) Date of Patent: Oct. 25, 2011

(54) SALES PLAN EVALUATION SUPPORT SYSTEM

(75) Inventors: Maho Urano, Hadano (JP); Kentaro Taguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1153 days.

(21) Appl. No.: 11/769,827

(22) Filed: Jun. 28, 2007

(65) Prior Publication Data

US 2008/0052143 A1 Feb. 28, 2008

(30) Foreign Application Priority Data

Aug. 23, 2006 (JP) ................................ 2006-226399

(51) Int. Cl.
*G06F 17/60* (2006.01)
(52) U.S. Cl. ...................................................... 705/7.25
(58) Field of Classification Search .................... 705/10, 705/7.25
See application file for complete search history.

(56) References Cited

U.S. PATENT DOCUMENTS

| 5,953,707 | A * | 9/1999 | Huang et al. ................. | 705/7.25 |
| 2002/0116282 | A1 * | 8/2002 | Martin et al. .................. | 705/26 |
| 2007/0016494 | A1 * | 1/2007 | Brown et al. .................. | 705/28 |

FOREIGN PATENT DOCUMENTS

| JP | 6-143105 | 5/1994 |
| JP | 11-025181 | 1/1999 |
| JP | 2004-161437 | 6/2004 |

OTHER PUBLICATIONS

Grant et al (Examining sales force performance in organizations that use behavior-based sales management processes), Feb. 1999, Industrial Marketing Management, vol. 25, Issue 5, pp. 361-371.*
Thome et al (Innovative Sales Planning and Management: A Framework Proposition), Jan. 2007, Innovative Marketing, vol. 3, pp. 1-15.*

* cited by examiner

*Primary Examiner* — Romain Jeanty
(74) *Attorney, Agent, or Firm* — Antonelli, Terry, Stout & Kraus, LLP.

(57) ABSTRACT

A technique is provided that supports making evaluations of impact on a business performance indicator, which varies depending on timing at which a change of plan is decided. A sales plan evaluation support system, includes: a unit which obtains master information that includes a sales plan of a product and is used as input for material requirements planning (MRP) calculation; a first MRP calculating unit which obtains a first order-placement plan through MRP calculation by using the master information as input, the first order-placement plan including an ordered-item count and an order-placement date of a required item for the product; a revision timing setting unit which sets timing for revising the sales plan; a master modifying unit which modifies the master information; and a second MRP calculating unit which obtains a second order-placement plan through MRP calculation by using an order-placement plan having an order-placement date preceding the revision timing included in the first order-placement plan, as an order-placement plan which has been implemented prior to the revision timing, and by using, as input, master information modified by the master modifying unit, the second order-placement plan including an ordered-item count and an order-placement date of a required item for the product.

7 Claims, 14 Drawing Sheets

FIG. 3

ORIGINAL MASTER 200

ORIGINAL SALES PLAN FILE 210

| 211 PRODUCT CD | 212 ITEM COUNT | 213 MANUFACTURE COMPLETION DATE | 214 MODEL |
|---|---|---|---|
| * * * | 20 | * * * | * * * |
| * * * | 10 | * * * | * * * |
| ⋮ | ⋮ | ⋮ | ⋮ |

ORIGINAL LEAD TIME FILE 220

| 221 PRODUCT CD | 222 COMPONENT CD | 223 ITEM COUNT | 224 PROCUREMENT LT | 225 MANUFACTURE LT |
|---|---|---|---|---|
| * * * | * * * | * * * | * * * | * * * |
| * * * | * * * | * * * | * * * | * * * |
| ⋮ | ⋮ | ⋮ | ⋮ | ⋮ |

ORIGINAL PLACED ORDER FILE 230

| 231 COMPONENT CD | 232 INCOMING QUANTITY | 233 INCOMING DATE | 234 ORDER PLACEMENT DATE |
|---|---|---|---|
| * * * | * * * | * * * | * * * |
| * * * | * * * | * * * | * * * |
| ⋮ | ⋮ | ⋮ | ⋮ |

INITIAL INVENTORY FILE 240

| 241 COMPONENT CD | 242 ITEM COUNT |
|---|---|
| * * * | * * * |
| * * * | * * * |
| ⋮ | ⋮ |

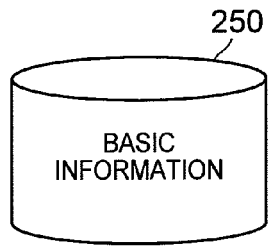

250 BASIC INFORMATION

FIG. 4

BASIC INFORMATION 250

MODEL FILE 2510

| ITEM CD (2511) | MODEL (2512) |
|---|---|
| * * * | * * * |
| * * * | * * * |
| ⋮ | ⋮ |

YEAR FILE 2520

| STARTING DATE (2521) | ENDING DATE (2522) | DISPLAY "YEAR/MONTH" (2522) |
|---|---|---|
| 2005/12/12 | 2005/12/18 | 2005/12 |
| * * * | * * * | * * * |
| ⋮ | ⋮ | ⋮ |

AMOUNT FILE 2530

| ITEM CD (2531) | UNIT PRICE (2532) |
|---|---|
| * * * | * * * |
| * * * | * * * |
| ⋮ | ⋮ |

ITEM NAME FILE 2540

| ITEM CD (2541) | ITEM NAME (2542) |
|---|---|
| * * * | * * * |
| * * * | * * * |
| ⋮ | ⋮ |

FIG. 5

ORIGINAL ORDER FILE 310

| PARENT-PRODUCT-AT-THE-POINT-OF-ORDER CD (311) | COMPONENT CD (312) | INCOMING QUANTITY (313) | INCOMING DATE (314) | ORDER PLACEMENT DATE (315) | FLAG (316) |
|---|---|---|---|---|---|
| * * * | * * * | * * * | * * * | * * * | * |
| * * * | * * * | * * * | * * * | * * * | * |
| ⋮ | ⋮ | ⋮ | ⋮ | ⋮ | ⋮ |

FLAG (0: EXISTED FROM BEGINNING,
1: ADDITIONALLY PROVIDED BASED ON ORIGINAL SALES PLAN)

FIG. 6

ORIGINAL ITEM LIST FILE 320

| PARENT ITEM CD 321 | ITEM CD 322 | ITEM NAME 323 | MODEL 324 | ENDING DATE 325 | INVENTORY QUANTITY 326 | INCOMING QUANTITY 327 | OUTGOING QUANTITY 328 | IN-PROGRESS QUANTITY 329 |
|---|---|---|---|---|---|---|---|---|
| X | x | PRODUCT R | ○○○ | 20060122 | 11 | 0 | | |
| X | x | PRODUCT R | ○○○ | 20060129 | 11 | 0 | | |
| X | x | PRODUCT R | ○○○ | 20060205 | 1 | 0 | 10 | 9 |
| X | x | PRODUCT R | ○○○ | 20060212 | 0 | 9 | 10 | 10 |
| X | x | PRODUCT R | ○○○ | 20060219 | 0 | 10 | 10 | 10 |
| X | x | PRODUCT R | ○○○ | 20060225 | 0 | 10 | 10 | 10 |
| X | x | PRODUCT R | ○○○ | 20060306 | 0 | 10 | 10 | 10 |
| X | x | PRODUCT R | ○○○ | 20060312 | 0 | 10 | 10 | 10 |
| X | x | PRODUCT R | ○○○ | 20060319 | 0 | 10 | 10 | 10 |
| X | x | PRODUCT R | ○○○ | 20060326 | 0 | 10 | 10 | |
| X | a | HDD | ○○○ | 20060122 | 20 | 10 | | |
| X | a | HDD | ○○○ | 20060129 | 28 | 8 | 54 | |
| X | a | HDD | ○○○ | 20060205 | 0 | 26 | 60 | |
| X | a | HDD | ○○○ | 20060212 | 0 | 60 | 60 | |
| X | a | HDD | ○○○ | 20060219 | 0 | 60 | 60 | |
| X | a | HDD | ○○○ | 20060226 | 0 | 60 | 60 | |
| X | a | HDD | ○○○ | 20060305 | 0 | 60 | 60 | |
| X | a | HDD | ○○○ | 20060312 | 0 | 60 | 60 | |
| X | a | HDD | ○○○ | 20060319 | 0 | 60 | 60 | |
| X | a | HDD | ○○○ | 20060326 | 0 | 0 | 0 | |
| ...... | | | | | | | | |

FIG. 8

SCENARIO FILE 400

| SCENARIO No. 401 | MODEL 402 | SALES PLAN DELAY PERIOD 403 | DECISION MAKING TIMING 404 | PLAN CHANGING RATE 405 | PLAN CHANGING PATTERN 406 | LEAD TIME CHANGING RATE 407 |
|---|---|---|---|---|---|---|
| 0 | *** | 0 WEEK | 0 WEEK LATER | — | — | — |
| | *** | 0 WEEK | | — | — | |
| 1 | *** | TWO WEEKS | TWO WEEKS LATER | 0.8 | 1 | 0.9 |
| | *** | TWO WEEKS | | 0.8 | 1 | |
| | *** | TWO WEEKS | | 0.8 | 1 | |
| 2 | *** | TWO WEEKS | 0 WEEK LATER | 1 | 2 | 1 |
| | *** | TWO WEEKS | | 1 | 2 | |
| | *** | TWO WEEKS | | 1 | 2 | |
| ...... | ...... | ...... | ...... | ...... | ...... | ...... |

FIG. 9

SCENARIO-BASIS MASTER 500

SCENARIO-BASIS SALES PLAN FILE 510

| 511 | 512 | 513 | 514 |
|---|---|---|---|
| PRODUCT CD | ITEM COUNT | MANUFACTURE COMPLETION DATE | MODEL |
| * * * | * * * | * * * | * * * |
| * * * | * * * | * * * | * * * |
| : | : | : | : |

SCENARIO-BASIS LEAD TIME FILE 520

| 521 | 522 | 523 | 524 | 525 |
|---|---|---|---|---|
| PRODUCT CD | COMPONENT CD | ITEM COUNT | PROCUREMENT LT | MANUFACTURE LT |
| * * * | * * * | * * * | * * * | * * * |
| * * * | * * * | * * * | * * * | * * * |
| : | : | : | : | : |

SCENARIO-BASIS PLACED ORDER FILE 530

| 531 | 532 | 533 | 534 | 535 |
|---|---|---|---|---|
| ITEM CD | INCOMING QUANTITY | INCOMING DATE | ORDER PLACEMENT DATE | FLAG |
| * * * | * * * | * * * | * * * | * |
| * * * | * * * | * * * | * * * | * |
| : | : | : | : | : |

INITIAL INVENTORY FILE 240

| 241 | 242 |
|---|---|
| COMPONENT CD | ITEM COUNT |
| * * * | * * * |
| * * * | * * * |
| : | : |

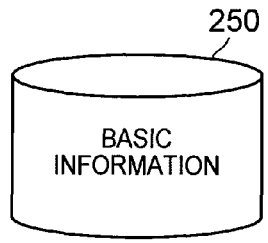

250

BASIC INFORMATION

FIG. 10

ORIGINAL ORDER FILE 310

| 311 | 312 | 313 | 314 | 315 | 316 |
|---|---|---|---|---|---|
| PARENT-PRODUCT-AT-THE-POINT-OF-ORDER CD | COMPONENT CD | INCOMING QUANTITY | INCOMING DATE | ORDER PLACEMENT DATE | FLAG |
| * * * | * * * | * * * | * * * | * * * | * |
| * * * | * * * | * * * | * * * | * * * | * |
| ⋮ | ⋮ | ⋮ | ⋮ | ⋮ | ⋮ |

↓ EXTRACT RECORDS HAVING ORDER-PLACEMENT DATES PRECEDING DECISION-MAKING TIMING

SCENARIO-BASIS PLACED-ORDER FILE 530

| 531 | 532 | 533 | 534 | 535 | 536 |
|---|---|---|---|---|---|
| PARENT-PRODUCT-AT-THE-POINT-OF-ORDER CD | COMPONENT CD | INCOMING QUANTITY | INCOMING DATE | ORDER PLACEMENT DATE | FLAG |
| * * * | * * * | * * * | * * * | * * * | * |
| * * * | * * * | * * * | * * * | * * * | * |
| ⋮ | ⋮ | ⋮ | ⋮ | ⋮ | ⋮ |

FIG. 11

SCENARIO-BASIS MRP CALCULATION RESULT 600

SCENARIO-BASIS ORDER FILE 610

| 611 | 612 | 613 | 614 | 615 | 616 | 617 |
|---|---|---|---|---|---|---|
| PARENT-PRODUCT-AT-THE-POINT-OF-PRODUCTION CD | PARENT-PRODUCT-AT-THE-POINT-OF-ORDER CD | COMPONENT CD | INCOMING QUANTITY | INCOMING DATE | ORDER PLACEMENT DATE | FLAG |
| *** | *** | *** | ** | *** | *** | * |
| *** | *** | *** | ** | *** | *** | * |
| .... | .... | .... | .... | .... | .... | .... |

FLAG (0: EXISTED FROM BEGINNING, 1: ADDITIONALLY PROVIDED BASED ON ORIGINAL SALES PLAN, 2: ADDITIONALLY PROVIDED BASED ON SCENARIO-BASIS SALES PLAN)

SCENARIO-BASIS ITEM LIST FILE 620

| 621 | 622 | 623 | 624 | 625 | 626 | 627 | 628 | 629 |
|---|---|---|---|---|---|---|---|---|
| PARENT ITEM CD | ITEM CD | ITEM NAME | MODEL | ENDING DATE | INVENTORY QUANTITY | INCOMING QUANTITY | OUTGOING QUANTITY | IN-PROGRESS QUANTITY |
| *** | *** | *** | *** | ** | ** | *** | *** | *** |
| *** | *** | *** | *** | ** | ** | *** | *** | *** |
| .... | .... | .... | .... | .... | .... | .... | .... | .... |

FIG. 12

SUMMARY TABLE 700

| ITEM | | | SALES AMOUNT | | INVENTORY AMOUNT | | IN-PROGRESS AMOUNT | | ORDER AMOUNT | | INCOMING AMOUNT | |
|---|---|---|---|---|---|---|---|---|---|---|---|---|
| MODEL | SCENARIO | ENDING DATE | 0 | 1 | 0 | 1 | 0 | 1 | 0 | 1 | 0 | 1 |
| ○○○ | | 20060115 | | | 0 | | 0 | | 5,000 | 5,000 | 0 | 1 |
| ○○○ | | 20060122 | 0 | | 18,400 | 18,400 | | | | 3,400 | 2,600 | 2,600 |
| ○○○ | | 20060129 | 0 | | 20,800 | 20,800 | | | | 10,000 | 2,400 | 2,400 |
| ○○○ | | 20060205 | 21,700 | 14,500 | 2,500 | 9,700 | 9,000 | 5,000 | | | 3,400 | 3,400 |
| ○○○ | | 20060212 | 23,000 | 18,400 | 0 | 6,300 | 10,000 | 6,000 | | | 20,500 | 15,000 |
| ○○○ | | 20060219 | 23,000 | 18,400 | 0 | 0 | 10,000 | 8,000 | | | 23,000 | 12,100 |
| ○○○ | | 20060226 | 23,000 | 18,400 | 0 | 0 | 10,000 | 8,000 | | | 23,000 | 18,400 |
| ○○○ | | 20060305 | 23,000 | 18,400 | 0 | 0 | 10,000 | 8,000 | | | 23,000 | 18,400 |
| ○○○ | | 20060312 | 23,000 | 18,400 | 0 | 0 | 10,000 | 8,000 | | | 23,000 | 18,400 |
| ○○○ | | 20060319 | 23,000 | 18,400 | 0 | 0 | 10,000 | 8,000 | | | 23,000 | 18,400 |
| ○○○ | | 20060326 | 10,000 | 8,000 | 0 | 0 | | | | | 10,000 | 8,000 |
| ○○○ | | ...... | ...... | | ...... | | ...... | | ...... | | ...... | |

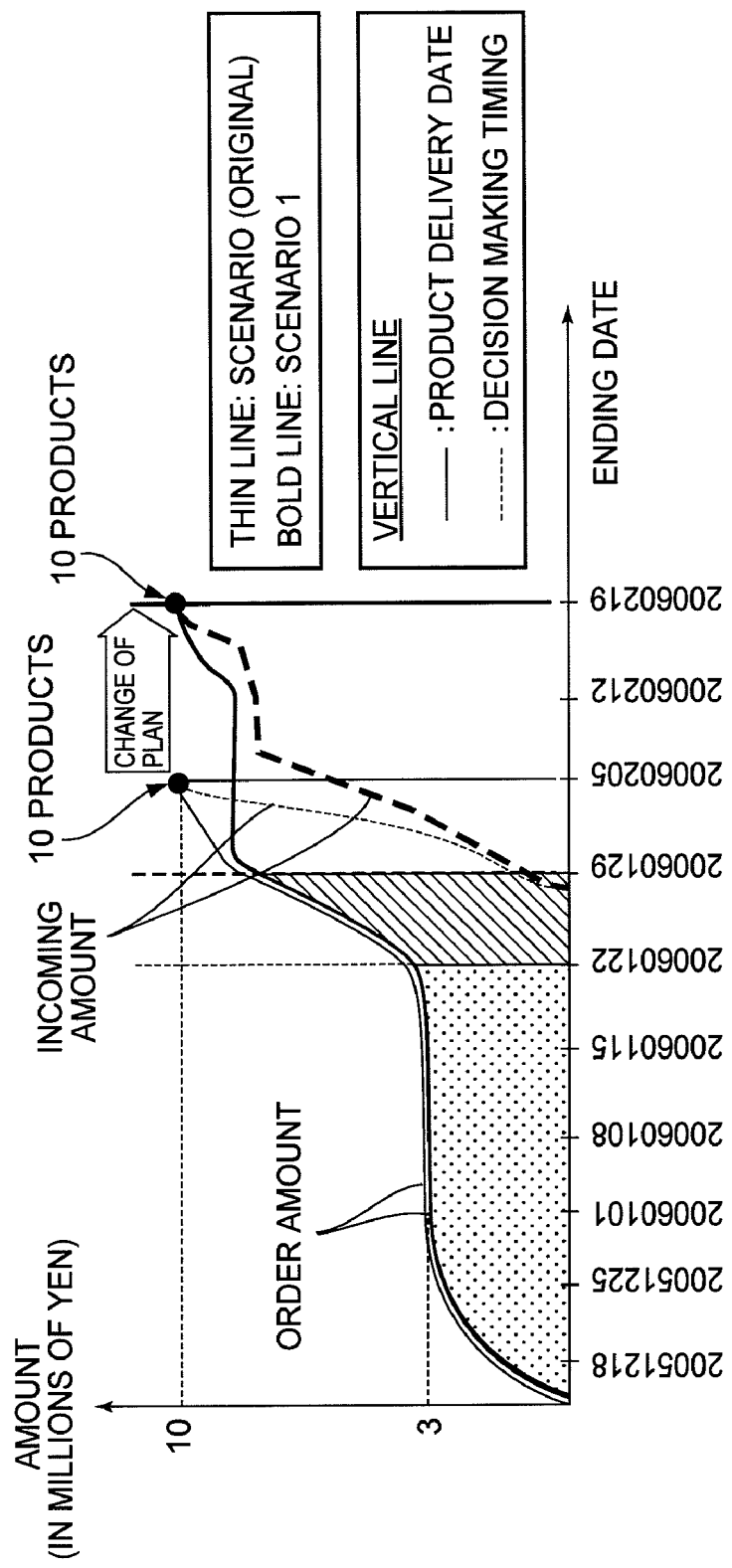

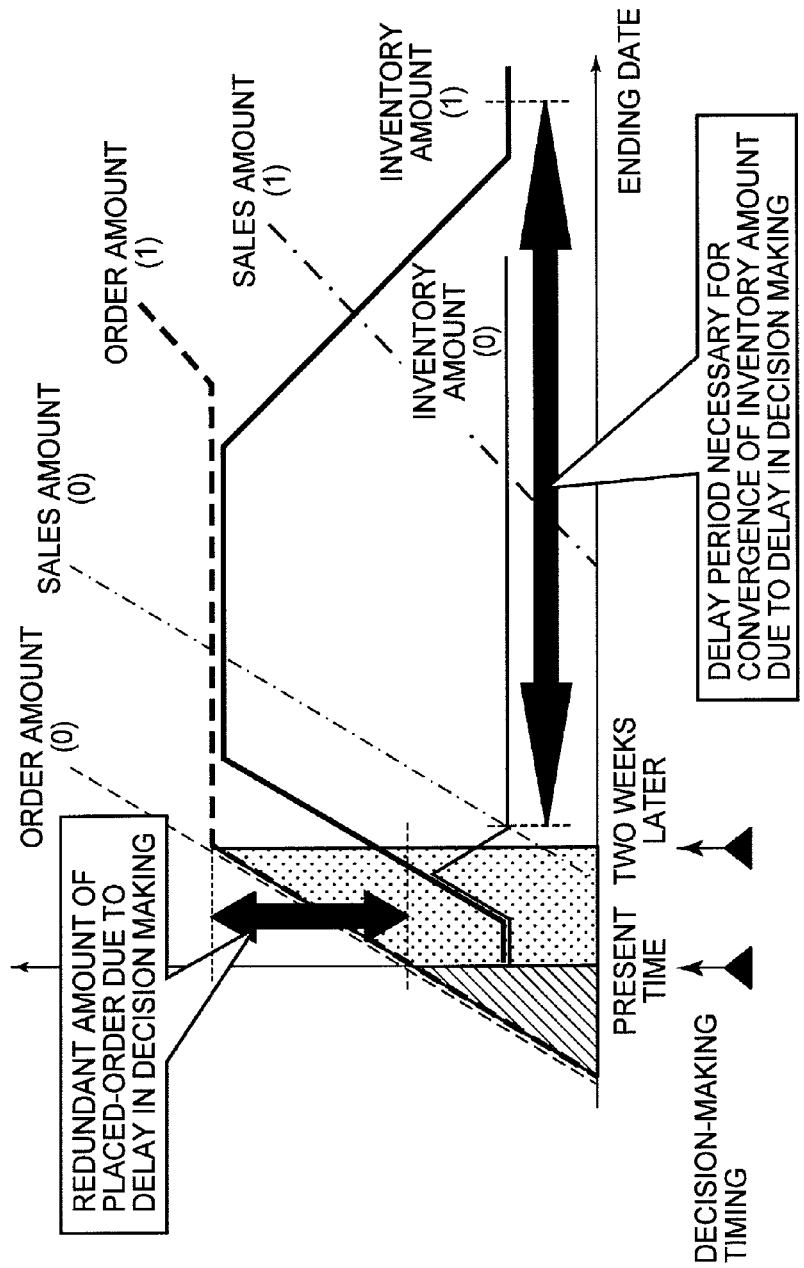

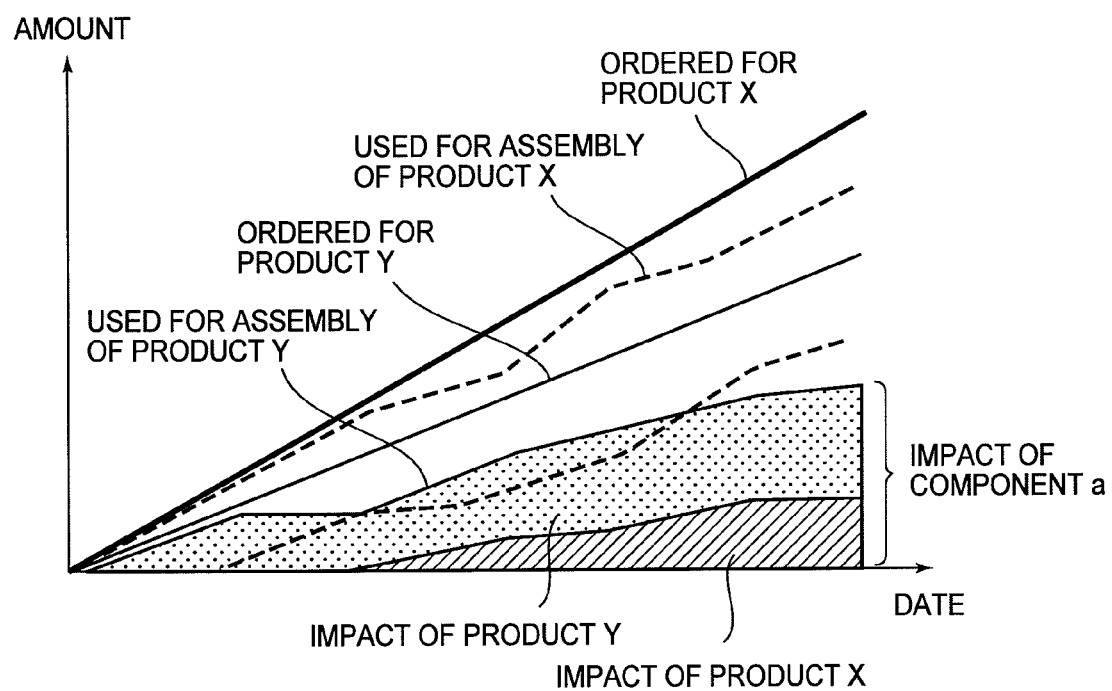

SALES PLAN EVALUATION SUPPORT SYSTEM

This application claims the priority based on the Japanese Patent Application No. 2006-226399 filed on Aug. 23, 2006. The entire contents of which are incorporated herein by reference for all purpose.

BACKGROUND OF THE INVENTION

The present invention relates to a technology of calculating and displaying a placed-order amount and an inventory amount which vary depending on timing of modifying a sales plan or lead time, to thereby support evaluations of the sales plan.

Material Requirements Planning (MRP) is a technique of material planning, which was proposed in the 1970s in the United States and has gained a broader range of application in recent years. The MRP method is intended to obtain, with respect to required items for a product, such as assemblies, components, and raw materials, a plan for purchasing or manufacturing necessary items in required quantities by a required deadline, based on a production plan or a sales plan prepared at product level, a bill of material, and information on inventory and placed-orders (remaining orders) or the like.

Further, as a method of accurately estimating future inventory assets even in a case where estimated volume of sales of a product in reality is inconsistent with its sales plan, a simulation system is proposed for calculating an inventory assets balance, in which a time point, based on which MRP calculation is performed, is moved forward, and MRP calculation is performed at each advanced time point to obtain an inventory quantity based on an incoming quantity/outgoing quantity and an inventory quantity at a previous time point, to thereby calculate how the inventory changes at each time point (refer to Japanese Patent Laid-open No. 2004-161437).

According to the conventional technology, it is possible to calculate how a future inventory assets balance changes, based on a current sales plan; however, it is difficult to see how the inventory assets balance changes, depending on the timing of revising the sales plan.

Also, according to the conventional system, it is possible to understand the behavior of components which eventually arrive in stock to increase the inventory; however, it is difficult to find out when the order for the components being in stock was placed and at what timing the components are purchased in a large quantity under the current plan. Accordingly, it is not possible to conduct a quantitative discussion on decision making timing, that is, how soon a corporate manager has to make a decision to change the plan in order to prevent increased risk of deteriorating business performance.

SUMMARY OF THE INVENTION

The present invention has been made to solve the above-mentioned problems, and it is an object of the invention to provide a technique of giving support to making evaluations of impact on a business performance indicator, which varies depending on timing at which a change of plan is decided.

In order to attain the above-mentioned object, the present invention provides a technique of obtaining impact on a business performance indicator, which varies depending on timing at which a sales plan is revised.

For example, a sales plan evaluation support system according to the present invention includes:

means which obtains master information that includes a sales plan of a product and is used as input for material requirements planning (MRP) calculation;

a first MRP calculating means which obtains a first order-placement plan through MRP calculation using the master information as input, the first order-placement plan including an ordered-item count and an order-placement date of a required item for the product;

revision timing setting means which sets timing for revising the sales plan;

master modifying means which modifies the master information; and a second MRP calculating means which obtains a second order-placement plan through MRP calculation by using an order-placement plan having an order-placement date preceding the revision timing included in the first order-placement plan as an order-placement plan which has been implemented prior to the revision timing, and by using, as input, master information modified by the master modifying means, the second order-placement plan including an ordered-item count and an order-placement date of a required item for the product.

BRIEF DESCRIPTION OF THE DRAWINGS

In the accompanying drawings:

FIG. 3 is a diagram showing a configuration of an original master;

FIG. 4 is a diagram showing a configuration of a basic information file;

FIG. 5 is a diagram showing a configuration of an original order file;

FIG. 6 is a diagram showing a configuration of an original item list file;

FIG. 8 is a diagram showing a configuration of a scenario file;

FIG. 9 is a diagram showing a scenario-basis master;

FIG. 10 is a diagram showing a method which creates a scenario-basis placed-order file;

FIG. 11 is a diagram showing a configuration of a result of scenario-basis MRP calculation;

FIG. 12 is a diagram showing a configuration of a summary table;

FIG. 13 is a display example of an impact degree on a business performance indicator evaluation graph;

FIG. 14 is another display example of the impact degree on a business performance indicator evaluation graph; and FIG. 15 is a display example of an inventory causality graph.

DESCRIPTION OF THE PREFERRED EMBODIMENT

Hereinbelow, an embodiment of the present invention is described in detail with reference to the accompanying drawings.

Figure 1:
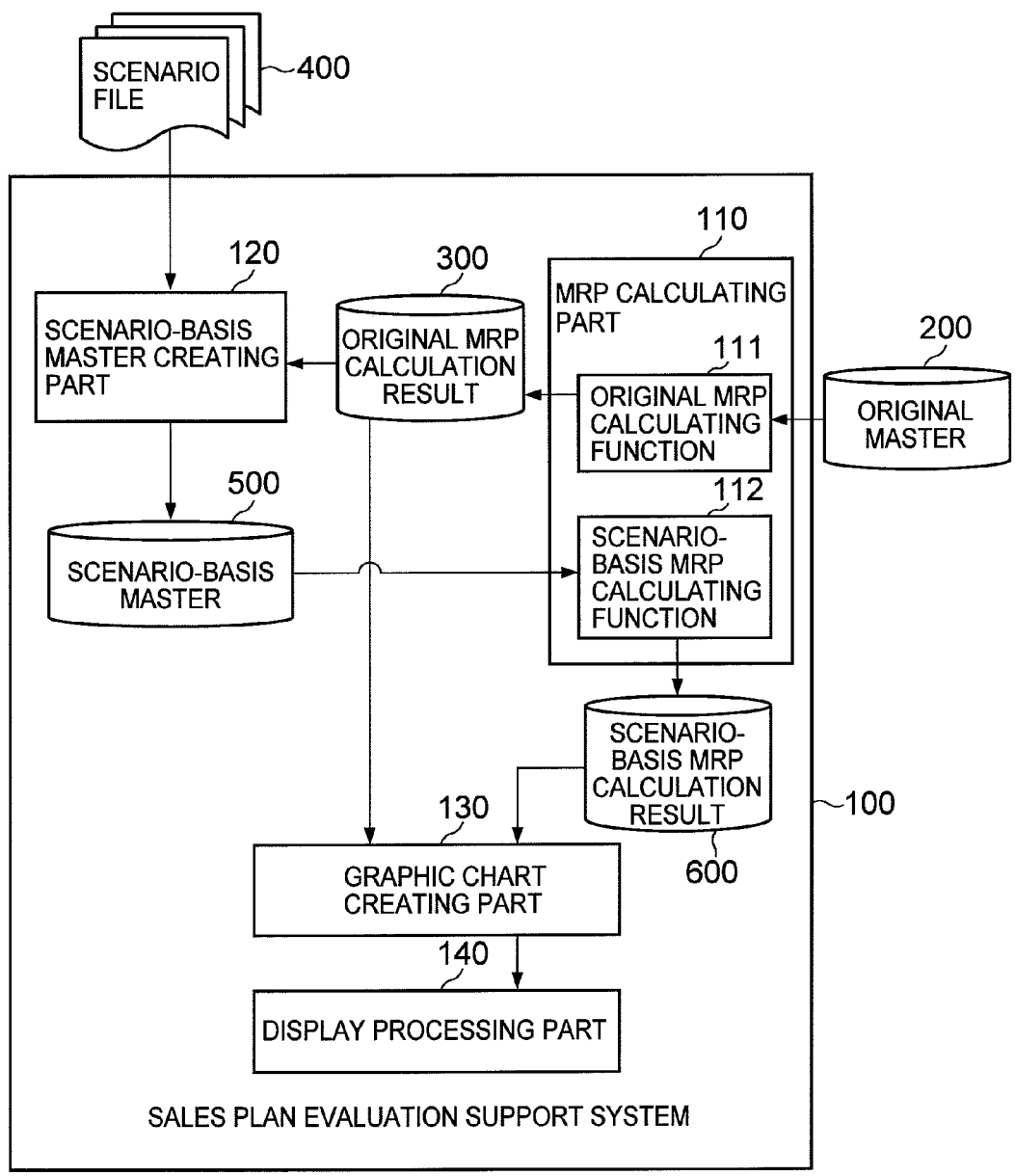
FIG. 1 is a schematic structural diagram of a sales plan evaluation support system.

FIG. 1 is a schematic structural diagram of a sales plan evaluation support system 100 to which the embodiment of the present invention is applied.

The sales plan evaluation support system 100 includes a device which gives support to a corporate manager, who manufactures and sells products, in making evaluations and revisions of sales plans. In particular, the system 100 gives support to the manager in deciding, in a case where the manager revises a procurement plan for components or revises various lead times, timing at which the revision should be made. The system 100 therefore includes a scenario for changing an original sales plan, and simulates impact on a business performance indicator obtained when the original sales plan is changed according to the scenario. The sales plan evaluation support system 100 receives, from the manager, settings and changes to be made to the scenario, and is capable of repeatedly performing the simulation.

As shown in FIG. 1, the sales plan evaluation support system 100 is configured by including, as a functional unit thereof, a material requirements planning (MRP) calculating part 110, a scenario-basis master creating part 120, a graphic chart creating part 130, and a display processing part 140.

The MRP calculating part 110 performs, based on an input of a predetermined file such as a sales plan file, a process of performing MRP calculation and outputting the calculation result. For example, the MRP calculating part 110 performs, based on an input from an original master 200 storing an original sales plan or the like, MRP calculation and outputs an original MRP calculation result 300 (original MRP calculating function 111). Also, the MRP calculating part 110 performs, based on an input from a scenario-basis master 500 storing a sales plan or the like obtained by changing the original sales plan according to the scenario, MRP calculation, and outputs a scenario-basis MRP calculation result 600 (scenario-basis MRP calculating function 112). The MRP calculating part 110 performs MRP calculation by a known method.

The scenario-basis master creating part 120 performs a process of creating the scenario-basis master 500 which stores, for example, a sales plan corresponding to a scenario, by using a scenario file 400 which defines a change to be made to the sales plan, a part of the original MRP calculation result 300 (information relating to order-placement), and a part of the original master 200 (a sales plan, lead time, or the like).

The graphic chart creating part 130 creates a table or a graph relating to business performance indicators (such as sales amount, inventory amount, in-progress amount, order amount, incoming quantity, etc.) by using the original MRP calculation result 300 and the scenario-basis MRP calculation result 600.

The display processing part 140 performs a process of displaying, on a display device, a table or a graph created by the graphic chart creating part 130.

The sales plan evaluation support system 100 is realized by a general-purpose computer system which is configured by including a central processing unit (CPU), a memory, an external storage device, an input device such as a keyboard, an output device such as a liquid crystal display device, and a bus for connecting those devices to one another. The CPU executes a predetermined program loaded into the memory, to thereby realize the above-mentioned functions and elements. Also, the memory or the external storage device stores information and files.

The output device or the input device may be directly connected to the CPU, or may be connected through a network.

Next, characteristic operations of the sales plan evaluation support system 100 as configured above are described.

Figure 2:
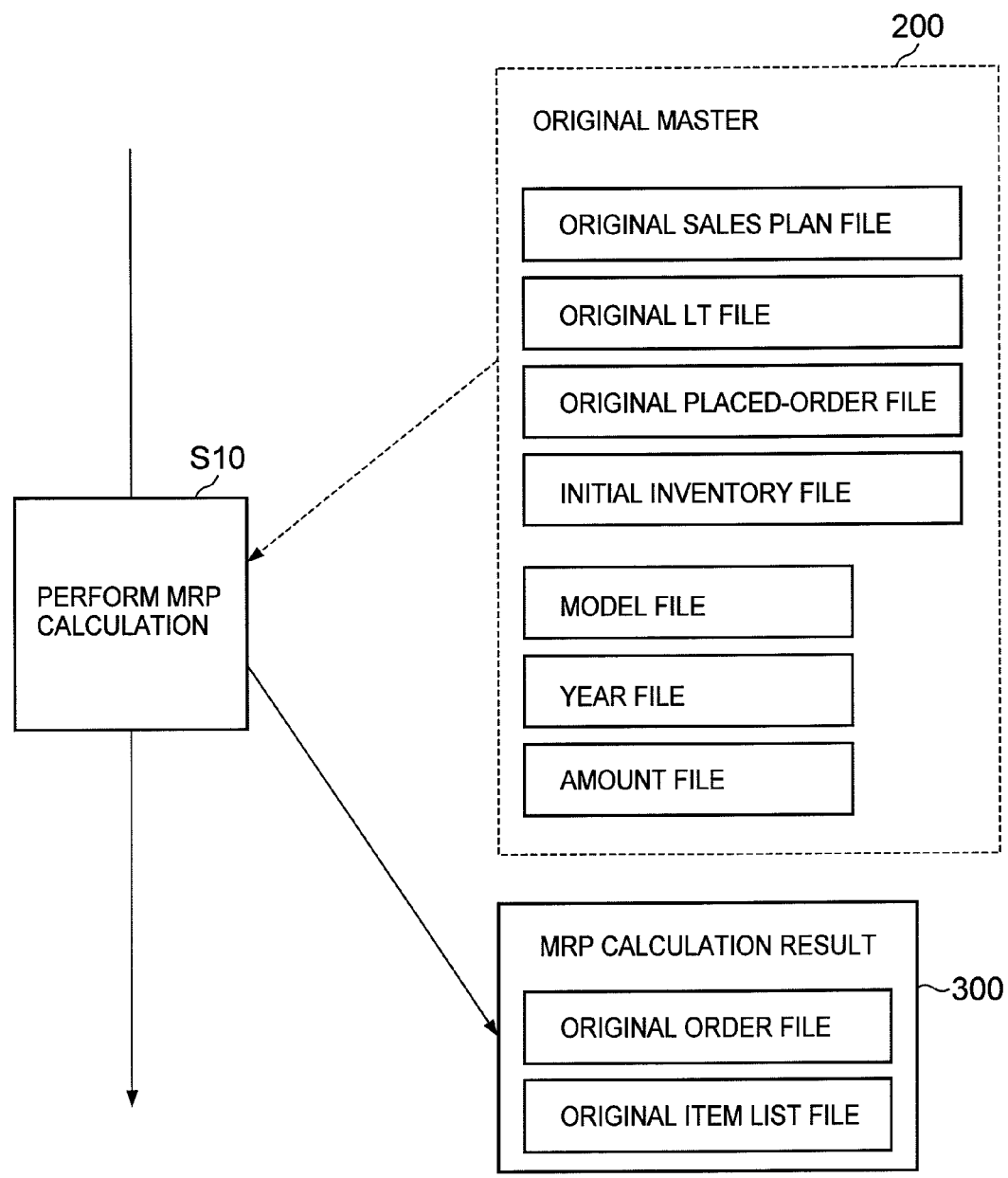
FIG. 2 is a flowchart of MRP calculation.

FIG. 2 is a flowchart of a process of performing MRP calculation based on an original sales plan or the like. The process flow is started in response to a request made by an operator through the input device to calculate a degree of impact on the business performance indicator obtained when the original sales plan is revised.

The MRP calculating part 100 performs MRP calculation by a known method based on an input from the original master 200, and outputs the calculation result (original MRP calculation result 300) (S10).

FIG. 3 is a diagram showing a configuration of the original master 200 which is used as a source of the input.

The original master 200 includes an original sales plan file 210, an original lead time file 220, an original placed-order file 230, and an initial inventory file 240, and a basic information file 250. In the following, information included in each of those files is described. However, all the information items may not actually exist, and may be omitted as deemed appropriate.

The original sales plan file 210 stores original sales plans of products. Specifically, the sales plans are stored in such a manner that each of the sales plans is provided with a record, which is associated with a code (product CD) 211 for identifying the product, an item count 212, a manufacture completion date 213, and a model 214. The item count 212 corresponds to the number of products to be completed. The manufacture completion date 213 corresponds to a date on which the manufacture of the product is completed. The product to be manufactured is affiliated with a model, and therefore, the model 214 stores a model with which the product is affiliated. The records are registered in chronological order by the manufacture completion date 213.

The original lead time file 220 stores information relating to a lead time necessary for procuring and assembling components which are required items for the product. Specifically, the information is stored in such a manner that each of the components is provided with a record, which is associated with a product CD 221, a code (component CD) 222 for identifying the component, an item count 223, a procurement lead time (procurement LT) 224, and a manufacture lead time (manufacture LT) 225. The product CD 221 corresponds to the product CD of a product for which the component is used. The item count 223 corresponds to the number of components to be used in the product. The procurement LT 224 corresponds to a time period which is necessary after an order is placed for the component until the component is put into storage. The product LT 225 corresponds to a time period which is necessary after the component in storage is delivered until the product using the component is assembled.

The relation between a product and a component is illustrated by the association of the product CD 221 and the component CD 222; however, a bill of material may also be separately provided. In general, the bill of material includes components arranged hierarchically in a plurality of different levels, in such a manner that the components are each categorized, for example, as an intermediate part for producing a product, or as a part for producing the intermediate part. In this embodiment, however, the bill of material includes only one layer containing the components necessary for producing a product which are all associated with the product with the intermediate parts being omitted to reduce processing time. Further, the lead time necessary for assembling the components is calculated in such a manner that the time necessary for assembling the components including the intermediate parts is summed so as to be calculated as a total manufacture lead time, to thereby obtain a manufacture lead time. The item count is also calculated in a similar manner with consideration given to the intermediate parts. For example, in a case where two of the intermediate parts are necessary for making one product, and another three parts are necessary for making each one of those intermediate parts, it is regarded that six components are necessary for creating one product, and therefore the item count is set to 6.

The original placed-order file 230 stores information relating to a component for which an order has already been placed but is yet to be received to be put in storage. Specifically, the information is stored in such a manner that each order is provided with a record, which is associated with a component CD 231, an incoming quantity 232, an incoming date 233, and an order-placement date 234.

The initial inventory file 240 stores information on inventory at a current time (a time when the operator has made a request to calculate a degree of impact on the business performance indicator based on the timing of the revision). Specifically, the information is stored in such a manner that each of the components is provided with a record, which is associated with a component CD 241 and an item count 242 in the inventory.

The basic information file 250 stores basic information which is not subject to change even if the scenario is changed. The basic information file 250 includes, as shown in FIG. 4, a model file 2510, a year file 2520, an amount file 2530, and an item name file 2540.

The model file 2510 stores information relating to models to which products or components belong. Specifically, the information is stored in such a manner that each of the items is provided with a record, which is associated with a code (item CD) 2511 for identifying the item and a model 2512. The products and the components are each referred to as "item".

The year file 2520 stores information relating to sectionalized periods obtained by dividing years by a predetermined time unit (for example, a week). Specifically, the information is stored in such a manner that each of the sectionalized periods is provided with a record, which is associated with a starting date 2521 of the sectionalized period, an ending date 2522 of the sectionalized period, and a date 2523 representing the sectionalized period (displayed as "date") used when displaying the sectionalized period.

The amount file 2530 stores information relating to amounts (unit prices) of items. Specifically, the information is stored in such a manner that each of the items is provided with a record, which is associated with an item CD 2531 and a unit price 2532.

The item name file 2540 stores information relating to names of the items. Specifically, each of the items is provided with a record, which is associated with an item CD 2541 and an item name 2542.

In the above, the original master 200 used for MRP calculation has been described. The original master 200 stores information items input by an operator through the input device. Those information items may be deleted and modified upon request of the operator.

The MRP calculating part 110 performs MRP calculation, based on the information input from the original master 200 described above, and outputs the original MRP calculation result 300 which includes an original order file 310 and an original item list file 320 (refer to a flowchart of FIG. 2).

FIG. 5 is a diagram showing a configuration of the original order file 310. The original order file 310 stores information relating to orders placed for the components. Specifically, the information is stored in such a manner that each of the orders is provided with a record, which is associated with an Parent-Product-at-the-point-of-order CD 311, a component CD 312, an incoming quantity 313, an incoming date 314, an order-placement date 315, and a flag 316.

The Parent-Product-at-the-point-of-order CD 311 corresponds to a product CD of a product for which an ordered component is used. The flag 316 stores a flag by which an order is distinguished as to whether the order has existed from the beginning or has been generated by the current MRP calculation. Specifically, the flag 316 stores "0" in a case where the order has already been included in the original placed-order file 230, while the flag 316 stores "1" in a case where the order has been generated by the current MRP calculation.

FIG. 6 is a diagram showing a configuration of the original item list file 320. The original item list file 320 stores, for each sectionalized period, a turnover result (with respect to, for example, an inventory quantity, an incoming quantity, an outgoing quantity, and an in-progress quantity) of each item (a product or a component). Specifically, each item and sectionalized period is provided with a record, which is associated with a parent item CD 321, an item CD 322, an item name 323, a model 324, an ending date 325, an inventory quantity 326, an incoming quantity 327, an outgoing quantity 328, and an in-progress quantity 329.

The parent item CD 321 represents an item for which an item of the item CD 322 is used. In a case where the item CD 322 is of a product, the parent CD 321 corresponds to the code of the product. In a case where the item CD 322 is of a component, the parent CD 321 is used for identifying the component as to whether the component has been delivered or put in storage and also identifying a parent item for which the component is intended. As regards the inventory quantity 326, items having different parent items are calculated as different items when compiling the item list file.

The item name 323 includes item names of items in the item CD 322. The item names are stored based on the item name file 2540. The model 324 includes models with which items of the parent item 321 are affiliated. The models are stored based on the model file 2510. The ending date 325 specifies the sectionalized period, and corresponds to the ending date 2522 of the year file 2520.

The inventory quantity 326 includes inventory quantities at dates related to the ending date 325. The incoming quantity 327 includes quantities which have been put in storage up the ending date 325 of the sectionalized period. The outgoing quantity 328 includes quantities which have been delivered up to the ending date 325 of the sectionalized period. The in-progress quantity 329 stores quantities related to the ending date 325. The in-progress quantity is generated in a case where, for example, the manufacture lead time is longer than one of the sectionalized periods in the year file 2520. For example, in a case where it take 8 days to produce a product X by assembling components A and B, and where each sectionalized period stored in the year file 2520 is constituted by a unit of week, the product X is not completed in a week, despite the fact that the components A and B have already been delivered, and the product X is not put in storage until 8 days has elapsed (a second week). In this case, the in-progress quantity for the product X is generated in the first week.

As described above, the MRP calculating part 110 performs MRP calculation based on the original sales plan or the like, and then performs a process of outputting another MRP calculation result obtained in a case where the sales plan or the like is changed in accordance with a scenario.

Figure 7:
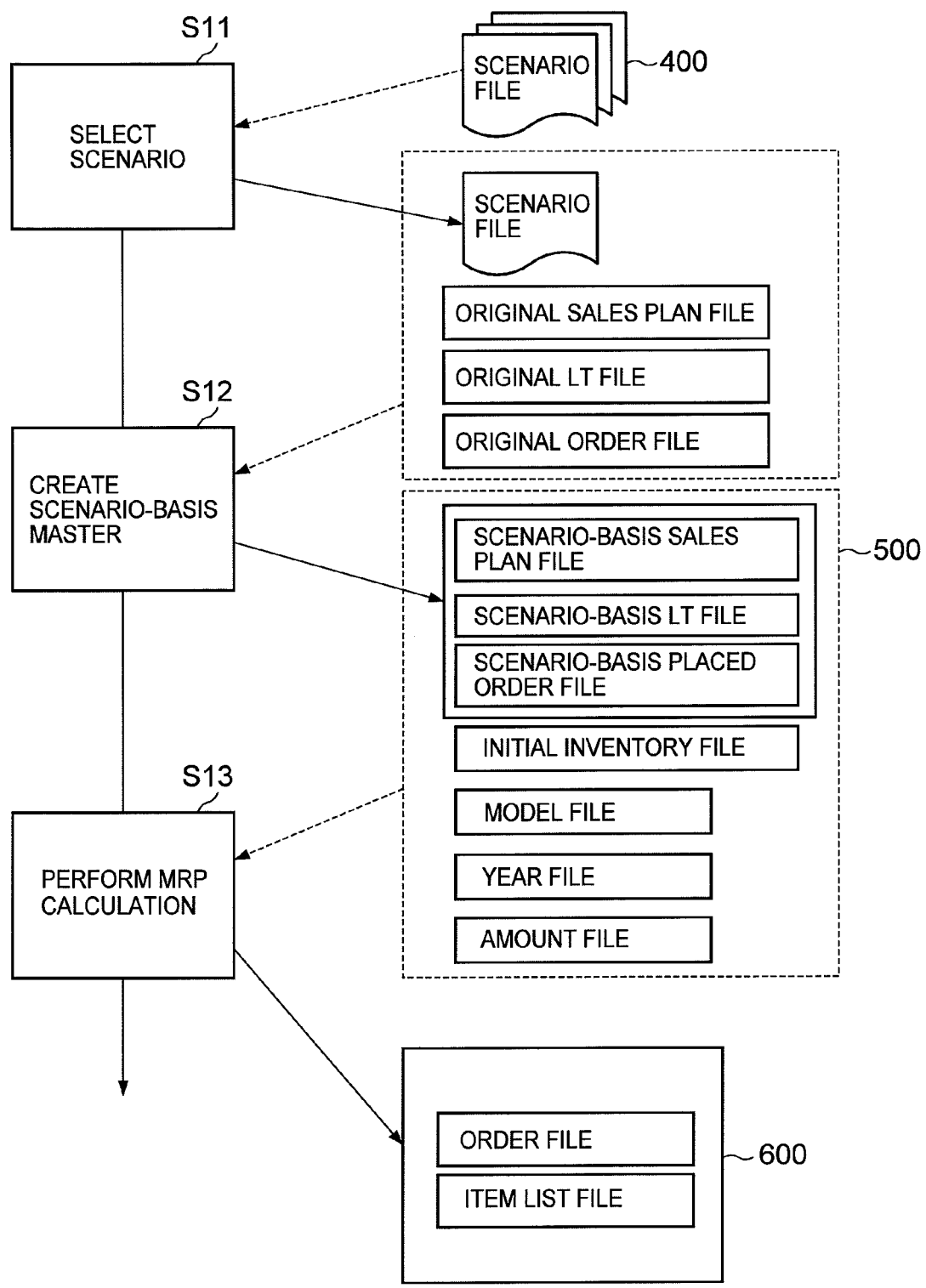
FIG. 7 is another flowchart of the MRP calculation.

FIG. 7 is a flowchart of the above-mentioned process.

First, the MRP calculating part 110 acquires, from among the scenarios stored in the scenario file 400, a scenario to be used for changing the original sales plan (S11).

FIG. 8 is a diagram showing a configuration of the scenario file 400.

The scenario file 400 stores information for changing the original sales plans which are stored in the original sales plan file 210 and the original lead times which are stored in the original lead time file 220. Specifically, the information is stored in such a manner that each of the scenarios for changing the original sales plans and the original lead times is provided with a record, which stores a scenario number 401, a model 402 to which the scenario is to be applied, a sales plan delay period 403, a decision making timing 404, a plan changing rate 405, a plan changing pattern 406, and a lead time changing rate 407. Each scenario may store a plurality of information items each relating to a plurality of models. However, each scenario has only one decision making timing 404 and one lead time changing rate 407 set thereto.

The sales plan delay period 403 is a period by which the manufacture completion date 213 of the original sales plan is delayed. The decision making timing 404 defines timing at which the scenario is applied, by using the current time (that is, a time at which MRP calculation is performed with respect to the original sales plan or the like) as a reference. The decision making timing 404 is used in determining a quantity of placed-orders, among the orders obtained through the original MRP calculation.

The plan changing rate 405 is a value to be used in changing the item count 212 of the original sales plan. The plan changing pattern 406 is a value to be used in changing the original sales plan. The lead time changing rate is a value to be used in changing the procurement/manufacture lead time.

In FIG. 8, a scenario indicating the original sales plan or the like, that is, a scenario that does not change the original sales plan or the like, is stored as "scenario 0". The decision making timing for the "scenario 0" corresponds to the date on which the original sales plan file 210 and the initial inventory file 240 are created, that is, the reference date (first date) for the original MRP calculation.

The information items stored in the scenario are input by the operator through the input device. The information items may be deleted or modified upon request of the operator.

The scenario may not have all the information items stored, but merely have, for example, the decision making timing defined.

A description is given with reference to the flowchart of FIG. 7. The scenario-basis master creating part 120 selects a scenario from among the scenarios stored in the scenario file 400. At this time, the scenario-basis master creating part 120 may select a scenario specified by the operator through the input device, or may select scenarios one at a time in sequence in ascending order of the scenario number (excepting "scenario 0").

Next, the scenario-basis master creating part 120 creates the scenario-basis master 500 (S12).

The scenario-basis master 500 basically has a configuration similar to that of the original master 200, as shown in FIG. 9. Specifically, the scenario-basis master 500 includes a scenario-basis sales plan file 510, a scenario-basis lead time file 520, a scenario-basis placed-order file 530, an initial inventory file 240, and a basic information file 250.

Described in the following is a method by which the scenario-basis master creating part 120 creates each of the above-mentioned files. All the information items to be stored in the files need not be present, and may be omitted.

First, the creation of the scenario-basis sales plan file 510 is described. The scenario-basis master creating part 120 creates a file to which the original sales plan file 210 is directly copied. Specifically, the scenario-basis master creating part 120 provisionally creates the scenario-basis sales plan file 510 which includes records, each storing a product CD 511, an item count 512, a manufacture completion date 513, and a model 514. After that, the item count 512 and the manufacture completion date 513 of each record are revised based on the model 402, the sales plan delay period 403, the plan changing rate 405, and the plan changing pattern 406 of the scenario selected in advance, whereby the scenario-basis sales plan file 510 is completed.

Specifically, the scenario-basis master creating part 120 obtains, from the selected scenario, the plan changing rate 405 corresponding to the model 514 of the scenario-basis sales plan file 510, and multiplies the item count 512 by the changing rate 405 thus obtained, to thereby revise the item count 512.

Also, the scenario-basis master creating part 120 revises the manufacture completion date 513 based on the sales plan delay period 403 and the plan changing pattern 406 of the selected scenario. The plan changing pattern 406 includes, for example, any one of the three following patterns.

Pattern 1: A sales plan is simply postponed by the sales plan delay period 403. Specifically, the sales plan delay period 403 is added to the manufacture completion date 513, to thereby revise the manufacture completion date 513.

Pattern 2: A sales plan in the sales plan delay period 403 is deleted, by considering that the orders for the sales plan delay period 403 have not been received. Specifically, first, the sales plan delay period 403 is added to an earliest manufacture completion date 513 of the manufacture completion dates 513 stored in the records in the scenario-basis sales plan file 510, to thereby obtain an ending date of the sales plan delay period 403. Then, the scenario-basis sales plan file 510 is searched in order to retrieve records having the manufacture completion dates 513 set so as to precede the ending date, and the retrieved records are deleted.

Pattern 3: A sales plan for the sales plan delay period 403 is added after the lapse of the sales plan delay period 403. Specifically, similarly to Pattern 2, the sales plan delay period 403 is added to an earliest manufacture completion date 513 of the manufacture completion dates 513 stored in the records in the scenario-basis sales plan file 510, to thereby obtain an ending date of the sales plan delay period 403. Then, the records having the manufacture completion dates 513 set to precede the ending date are deleted. Further, the item counts 512 of all the records thus deleted are added to the item count 512 of a first record (that is, a record having the manufacture completion date 513 immediately following the sales plan delay period 403) of the remaining records, to thereby revise the item count 512 of the first record.

Next, the creation of the scenario-basis lead time file 520 is described. The scenario-basis master creating part 120 creates a file to which the original lead time file 220 is directly copied. Specifically, the scenario-basis master creating part 120 creates a file which includes records each storing a product CD 521, a component CD 522, an item count 523, a procurement LT 524, and a manufacture LT 525. Further, the procurement LT 524 and the manufacture LT 525 included in the file thus created are each multiplied by the lead time changing rate 407 of the scenario selected in advance, whereby a process of revising the procurement LT 524 and the manufacture LT 525 is performed.

Next, with reference to FIG. 10, the creation of the scenario-basis placed-order file 530 is described. The scenario-basis master creating part 120 extracts, from among the records stored in the original order file 310, records each having an order-placement date 315 which is set to precede the decision making timing 404 of the selected scenario. Then, the records thus extracted are compiled, to thereby create the scenario-basis placed-order file 530 which includes records each storing an Parent-Product-at-the-point-of-order CD 531, a component CD 532, an incoming quantity 533, an incoming date 534, an order-placement date 535, and a flag 536.

The initial inventory file 240 and the basic information file 250 are similar to those of the original master 200, and not subject to change.

The scenario-basis master creating part 120 may receive detailed settings for a scenario-basis MRP creation file 500 from the operator through the input device. For example, the scenario-basis master creating part 120 receives a request to make a change only to a certain item in terms of procurement LT and manufacture LT, or in terms of sales plan, and modifies the certain item accordingly. In this manner, it is possible to evaluate a degree of impact on the business performance indicator in various ways.

In the above, the process of creating the scenario-basis master 500 has been described.

Next, the MRP calculating part 100 performs MRP calculation based on an input from the scenario-basis master 500, and outputs the scenario-basis MRP calculation result 600 (S13 of FIG. 7).

The scenario-basis MRP calculation result 600 includes, as shown in FIG. 11, a scenario-basis order file 610 and a scenario-basis item list file 620.

The scenario-basis order file 610 stores, similarly to the original order file 310, information relating to the orders placed for the components. Specifically, the information is stored in such a manner that each order is provided with a record, which is associated with a Parent-Product-at-the-point-of-production CD 611, an Parent-Product-at-the-point-of-order CD 612, a component CD 613, an incoming quantity 614, an incoming date 615, an order-placement date 616, and a flag 617.

The applied-usage CD 611 corresponds to a code of a product for which the ordered component is to be used in a case where the product is manufactured according to the selected scenario. The Parent-Product-at-the-point-of-order CD 612 corresponds to a code for a product for which the component was supposed to be used in the original sales plan. The flag 617 indicates when the order is generated. Specifically, the flag 617 stores "0" in a case where the order has already existed before the original MRP calculation, stores "1" in a case where the order is additionally placed based on a result of the MRP calculation of the original sales plan, and stores "2" in a case where the order is additionally placed based on a result of the scenario-basis MRP calculation performed at this time.

The scenario-basis item list file 620 has a configuration similar to that of the original item list file 320. Specifically, the scenario-basis item list file 620 stores, for each sectionalized period, information relating to a turnover result (with respect to, for example, an inventory quantity, an incoming quantity, an outgoing quantity, and an in-progress quantity) of each item (a product or a component). In other words, each record is stored in association with a parent item CD 621, an item CD 622, an item name 623, a model 624, an ending date 625, an inventory quantity 626, an incoming quantity 627, an outgoing quantity 628, and an in-progress quantity 629.

The original MRP calculation result 300 and the scenario-basis MRP calculation result 600 are outputted as described above. Then, based on the information, the graphic chart creating part 130 creates a summary table, a graph for evaluating a degree of impact on business performance indicator (hereinafter, referred to as impact degree on business performance indicator evaluation graph), and an inventory causality graph, and outputs the table and the graphs to the display device or the like, through the display processing part 140.

FIG. 12 shows an example of the summary table 700. In the summary table 700, the business performance indicators for the respective sectionalized periods are summarized with respect to each model. As shown in FIG. 12, the summary table 700 is configured by listing, for example, a model 701, an ending date 702 of the sectionalized period, a sales amount 703, an inventory amount 704, an in-progress amount 705, an order amount 706, and an incoming amount 707. The summary table 700 of FIG. 12 collectively shows data for those items obtained from both the original sales plan and the changed sales plan according to the selected scenario.

The business performance indicator may be summarized for each model, or may be summarized, as shown in FIG. 12, for a specific model, for other models, and for a total of all the models, respectively.

The sales amount 703 is obtained by multiplying the outgoing quantity for each product stored in the original item list file 320 or in the scenario-basis item list file 620, by a unit price of the product. The unit price of the product is obtained by acquiring a unit price 2532 corresponding to the item CD 2531 of the product, based on the amount file 2530.

The inventory amount 704 is obtained by multiplying the inventory quantity of each item in the original item list file 320 or in the scenario-basis item list file 620 by a unit price thereof and by summing up the inventory amounts thus obtained for each item.

The in-progress amount 705 is obtained by multiplying the in-process quantity of each product stored in the original item list file 320 or in the scenario basis item list file 620 by a unit price of the product.

The order amount 706 is obtained by multiplying the incoming quantity of each item stored in the order files 310 and 610 by a unit price of the item and by summing up the order amounts thus obtained for each item.

The incoming amount 707 is obtained by multiplying each of the numbers of items stored in the item list files 320 and 620 by the corresponding unit price and by summing up the inventory amount thus obtained for each item.

In order to summarize the business performance indicator by model, the business performance indicator is obtained for each model by adding up the sales amounts, the inventory amounts, the in-progress amounts, and the incoming amounts of products belonging to the same model.

Next, a description is given of the creation of the impact degree on business performance indicator evaluation graph.

The graphic chart creating part 130 creates the impact degree on business performance indicator evaluation graph in response to a request from the operator, and displays the graph on a display device or the like through the display processing part 140.

FIG. 13 is a graph created based on the information included in the summary table 700 of FIG. 12.

The graphic chart creating part 130 creates a graph which has the ending date (ending date of the sectionalized period) or the date on the abscissa axis and the amount on the vertical axis. The graph is created by including the sales amount, the order amount, and the incoming amount, which are the sum values of the respective periods, and the inventory amount and in-progress amount, which correspond to the amounts of the ending date. At the same time, the decision making timing is also displayed. The items may selectively be displayed on the graph, as necessary.

In FIG. 13, the thin line indicates the original sales plan (scenario 0), and the bold line indicates the scenario 1. The vertical solid line indicates a product delivery date (i.e., the manufacture completion date of the product) and the vertical dashed line indicates the decision making timing.

For example, a case is assumed where a sales plan (scenario 0) was made on 22 Jan. to deliver 10 products on 5 February. However, the sales plan was later revised with the change in demand recognized, and a decision was made on 29 Jan. to postpone the date to postpone delivery of 10 products, from 5 Feb. to 19 Feb. (scenario 1). In this case, the order amount and the incoming amount of each of the scenarios change as shown in FIG. 13.

Specifically, the placed-order amount on 22 Jan. is about 3 million yen, which drastically increases to 8 million yen, which is more than double, on 29 Jan. It is understood from the graph that if the sales plan had been revised earlier and the decision to change the sales plan had been made on 22 Jan. there would have been no need to place additional orders until at least 5 February, and the placed-order amount would not have been increased from the original amount (of about 3 million yen).

Further, the item count in this sales plan is not changed and therefore the received items are eventually delivered. However, in a case where the item count in the sales plan is changed, the inventory amount may increase due to the order placed for the extra number of components according to an older sales plan because of the delay in the decision making timing. At the launch of a new product, for example, a change in design is often made. Accordingly, if the inventory amount is made redundant as described above, some of the components may not be consumed due to the change in design, and therefore there remains no choice but to discard the redundant components.

It is understood from the above description that it is important to control the order-placement so as not to purchase unnecessary components in order to reduce the risk of deteriorating the business performance. However, it is not possible to correctly know the timing for revising the plan as described above by only estimating and analyzing the incoming amount and the inventory amount as in the conventional case. Therefore, the order-placement amount (placed-order amount and planned-order amount) is displayed in the graph as shown in FIG. 13, which makes it possible to identify the timing for making a decision to revise and to modify the plan.

To describe the above in further detail, in a case where the line indicating the order amount rises with a gentle curve, there is not so much impact on the business performance indicator even if the timing of decision making is a little late. In other words, the amount of additional orders to be placed is small, and therefore the manager is allowed to make a decision after watching the trend of demand for a while. On the other hand, in a period where the line indicating the order amount is soaring with a steep curve, the amount of additional orders is large, and therefore, the sales plan should be revised immediately and the decision therefore should also be immediately made. In a case of being late for making the decision, though it may seem that supply chain management (SCM) is not affected for a while, components will arrive at some future time and the inventory eventually increases.

For this reason, with respect to the curved line of the order amount, the vertical lines are additionally provided for the respective decision making timings so as to separately display each range defined by the vertical lines, to thereby make it possible to identify the decision making timing for revising the plan.

FIG. 14 is another impact degree on business performance indicator evaluation graph, which is created by the graphic chart creating part 130.

The graphic chart creating part 130 displays the order amount, the sales amount, and the inventory amount in a graph, based on the summary table 700. The graph has the abscissa axis showing period and the vertical axis showing amount, and displays the original sales plan and the revised sales plan according to the scenario as being compared with each other.

FIG. 14 is an impact degree on business performance indicator evaluation graph, which shows how the sales amount, the order amount, and the inventory amount change in a case where a certain plan (scenario 0) is revised after the lapse of two weeks and the revised plan (scenario 1) is executed.

It is understood from the graph that the timing for making a decision to revise the plan is late, and therefore the order is placed for an excessive amount, which is equal to or more than twice as large as the necessary amount. It is also understood that the inventory amount takes about 10 weeks to converge on a proper figure.

In other words, with reference to the graph, it is possible to easily recognize the importance of the timing to change the sales plan.

The above-mentioned graph shows information relating to only two scenarios (the original scenario and scenario 1) for explanation. The graphic chart creating part 130 may create, however, a summary table including information items relating to three or more scenarios, which may also be displayed as a graph. However, in a case where the increased number of scenarios is displayed, it may become difficult to grasp the information displayed in the graph which includes all the business performance indicators (sales amount, inventory amount, in-progress amount, order amount, incoming amount), which may affect the decision making. For this reason, the items may be selectively displayed on the graph in accordance with a designation of the operator.

FIG. 15 is a graph created by the graphic chart creating part 130, which shows inventory causality. The inventory causality graph shows information on a certain component "a", the information including: a product for which the component "a" has been ordered; a product in which the component "a" is actually assembled; and a product for which the component "a" is in the inventory. Specifically, based on the inventory causality graph, it is possible to easily identify the reason for which inventory is remaining(for example, a product, for which components increased, has been subject to a change of plan, or the like) when the inventory has increased.

The graphic chart creating part 130 creates the inventory causality graph with the abscissa axis of date and the vertical axis of amount (or inventory amount), by using information included in the scenario-basis placed-order file 610 and the scenario-basis item list file 620.

FIG. 15 shows an exemplary case where the same component is used for two different products. For example, a case is assumed where a product X and a product Y both use the component "a", and the procurement plans for both the product X and the product Y have been changed, leading to a great increase of the inventory amount of the component "a". In this case, it has conventionally been difficult to analyze the cause of the increase of the inventory as to which of the changes made to the product X and the product Y is late, for which the component "a" has been excessively purchased as a result. However, by using information included in the scenario-basis order file 610 indicating for which product the original order has been placed, to procure the component thereof (Parent-Product-at-the-point-of-order CD 612) and information indicating for which product the ordered component has actually been used for assembling (Parent-Product-at-the-point-of-production CD 611), it is possible to identify the Parent-Product-at-the-point-of-order and the Parent-Product-at-the-point-of-production.

Now, a method of calculating the placed-order quantities for a plurality of products is described in the following. The description of the method of calculating the placed-order quantities is given to an exemplary case where the product X and the product Y commonly use the component "a".

For example, a case is assumed where the scenario information has a plan changing rate 405 set thereto, for changing the sales plan for the products X to decrease the number thereof while increasing the number of the products Y. In the above-mentioned case, in performing the scenario-basis MRP calculation based on the sales plan in which the scenario information is reflected, the components "a" which have been ordered for the product Y based on the information included in the original order file 310 obtained by the original MRP calculation, have run out in the middle of the calculation while the component "a" is still needed for the assembly of the product Y. In such a case, a check is made as to whether the components "a" ordered for another product (product X in this case) are still remaining before placing a new order for the product Y, and in a case where the components "a" are still remaining, the components "a" for which the order has already been placed are used for the product Y. Specifically, in this example, according to the scenario-basis order file 610, the applied-usage CD 611 corresponds to the product Y and the Parent-Product-at-the-point-of-order CD 612 corresponds to the product X.

In FIG. 15, "order for product X" on the graph can be obtained by multiplying the incoming amount 614 of components having the Parent-Product-at-the-point-of-order CD 612 corresponding to the product X in the scenario-basis order file 610, by the unit price thereof. The incoming date 615 is referred to as the date.

"Used for the assembly of product X" on the graph can be obtained by multiplying the incoming amount of components having the Parent-Product-at-the-point-of-production CD 611 corresponding to the product X by the unit price thereof. The incoming date 615 is referred to as the date.

The inventory amount of the components "a" in the graph is created based on the information included in the scenario-basis item list file 620. Specifically, the inventory amount of the components "a" is calculated by multiplying the inventory amount of the component shaving the item CD 622 corresponding to the component "a" and the parent item CD 621 corresponding to the product X or the product Y, by the unit price thereof. The ending date 625 is used as the date.

The above-mentioned information items are accumulated, and changes in the inventory amount obtained based on the Parent-Product-at-the-point-of-order and the Parent-Product-at-the-point-of-production of each product and on the scenario-basis item list file 620 are lined up on a graph, thereby making it possible to easily identify which one of the changes made to the sales plans of which product is causing the increase in the inventory amount.

With the graph which makes it possible to perform analysis as described above, it is possible to easily identify the cause of the increase in the inventory amount even if the component is commonly used for different products, and to take measures accordingly by, for example, revising the plan, accelerating the timing of the revision of the plan, or reducing the cost of components. This graph is effective in foreseeing and preventing deterioration in the business performance.

By performing the calculation on the component consumption and the order logic as described above, it is possible to find out which one of the changes made to the sales plans of which product has increased the inventory, and to confirm whether or not there is flexibility for changing plans by increasing components commonly used for different products.

In the above, the embodiment of the present invention has been described.

According to the above-mentioned embodiment, the manager sets, as the scenario information, timing to change the sales plan or the lead time, thereby making it possible to readily evaluate with ease the degree of impact, in terms of the ordered amount and the inventory amount, on the business performance. Also, with reference to the curved line of the order amount of the impact degree on business performance indicator evaluation graph, it is possible to identify, in advance, the need to revise the plan in the period during which the order amount is high, and with reference to the inventory causality graph, it is possible to analyze, in advance, the reason why the components become redundant in inventory, which makes it possible to take measures to prevent deterioration in the business performance.

It should be noted, however, that the present invention is not limited to the above-mentioned embodiment, and various modifications can be made thereto.

For example, in a case where a table or a graph showing a degree of impact on the business performance indicator is displayed after the scenario-basis MRP calculation is performed, the scenario-basis master creating part 120 may display, on the display device, a screen for receiving a request to change the scenario. Then, after the operator has specified the scenario number to modify, the changes to be made are received and the scenario is changed accordingly. After that, the scenario thus modified may be subject to the process of S12 and the rest of the processes following S12 of FIG. 7.

What is claimed is:

1. A sales plan evaluation support system, comprising:
   means which obtains master information that includes a sales plan of a product and is used as input for material requirements planning (MRP) calculation;
   a first MRP calculating means which obtains a first order-placement plan through MRP calculation using the master information as input, the first order-placement plan including an ordered-item count and an order-placement date of a required item for the product;
   revision timing setting means which sets timing for revising the sales plan;
   master modifying means which modifies the master information; and
   a second MRP calculating means which obtains a second order-placement plan through MRP calculation by using an order-placement plan having an order-placement date preceding the revision timing included in the first order-placement plan as an order-placement plan which has been implemented prior to the revision timing, and by using, as input, master information modified by the master modifying means, the second order-placement plan including an ordered-item count and an order-placement date of a required item for the product.

2. A sales plan evaluation support system according to claim 1, wherein:
   the master information comprises:
      a sales plan of a product, which includes information on a product to be sold, an item count thereof, and a manufacture completion date thereof;
      a lead time for procuring and manufacturing a required item for the product;
      an initial inventory of the required item; and
      an ordered-item count and an order-placement date for the required item which has already been ordered; and
   the first MRP calculating means and the second MRP calculating means each calculate a business performance indicator which includes at least one of information items on incoming quantity, outgoing quantity, order quantity, inventory quantity, and in-progress quantity, for each item.

3. A sales plan evaluation support system according to claim 2, further comprising display means which displays, in a graph, the revision timing together with the business performance indicator.

4. A sales plan evaluation support system according to claim 2, further comprising:
  means which stores a unit price for each item;
  means which obtains a business performance indicator converted into an amount of money by using the unit price for each item; and
  display means which displays, in a graph, the revision timing together with the business performance indicator converted into an amount of money.

5. A sales plan evaluation support system according to claim 1, wherein:
  the second MRP calculating means identifies, with respect to each of the required items, an Parent-Product-at-the-point-of-order for which the required item is ordered, and an applied-usage product for which the required item received based on the order is used; and
  the sales plan evaluation support system further comprises display means which displays, in a graph, one of an order amount and an incoming amount, of the Parent-Products-at-the-point-of-order and the Parent-Products-at-the-point-of-production relating to the required items.

6. An evaluation support method for a sales plan evaluation support system, comprising:
  a step which obtains master information that includes a sales plan of a product and is used as input for material requirements planning (MRP) calculation;
  a first MRP calculating step which obtains a first order-placement plan through MRP calculation using the master information as input, the first order-placement plan including an ordered-item count and an order-placement date of a required item for the product;
  a revision timing setting step which sets timing for revising the sales plan;
  a master modifying step which modifies the master information; and
  a second MRP calculating step which obtains a second order-placement plan through MRP calculation by using an order-placement plan having an order-placement date preceding the revision timing included in the first order-placement plan as an order-placement plan which has been implemented prior to the revision timing, and by using, as input, master information modified by the master modifying step, the second order-placement plan including an ordered-item count and an order-placement date of a required item for the product;
  wherein the evaluation support method is implemented at least in part, by a hardware processor and memory.

7. A program which causes a computer to function as a sales plan evaluation support system, the program causing the computer to function as:
  means which obtains master information that includes a sales plan of a product and is used as input for material requirements planning (MRP) calculation;
  a first MRP calculating means which obtains a first order-placement plan through MRP calculation using the master information as input, the first order-placement plan including an ordered-item count and an order-placement date of a required item for the product;
  revision timing setting means which sets timing for revising the sales plan;
  master modifying means which modifies the master information; and
  a second MRP calculating means which obtains a second order-placement plan through MRP calculation by using an order-placement plan having an order-placement date preceding the revision timing included in the first order-placement plan as an order-placement plan which has been implemented prior to the revision timing, and by using, as input, master information modified by the master modifying means, the second order-placement plan including an ordered-item count and an order-placement date of a required item for the product.

* * * * *